(No Model.) 2 Sheets—Sheet 1.

J. A. FURMAN.
DIE FOR MOLDING HOLLOW ARTICLES OF CELLULOID OR ANALOGOUS MATERIAL.

No. 369,784. Patented Sept. 13, 1887.

WITNESSES:
Thomas Hunt
Henry E. Everding

INVENTOR
John A. Furman
BY
C. Wyllys Betts
ATTORNEY (No Model.)　　　　　　　　　　　　　　　　2 Sheets—Sheet 2.
J. A. FURMAN.
DIE FOR MOLDING HOLLOW ARTICLES OF CELLULOID OR ANALOGOUS MATERIAL.
No. 369,784.　　　　　　　　　　Patented Sept. 13, 1887.
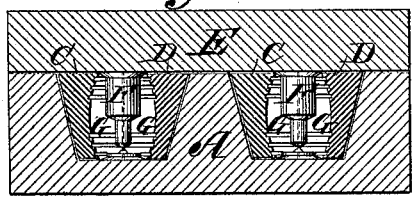
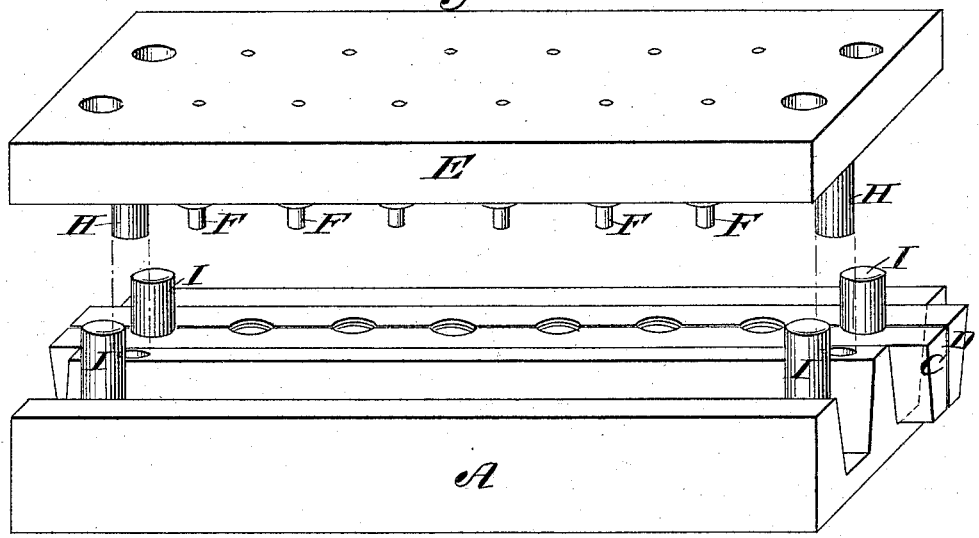
WITNESSES:　　　　　　　　　　　　　　　INVENTOR
Thomas Hunt　　　　　　　　　　　　　John A. Furman
Henry E. Everding　　　　　　　　　BY C. Wyllys Betts
　　　　　　　　　　　　　　　　　　　　ATTORNEY

UNITED STATES PATENT OFFICE.

JOHN A. FURMAN, OF NEWARK, NEW JERSEY, ASSIGNOR OF ONE-HALF TO THE CELLULOID NOVELTY COMPANY, OF NEW YORK, N. Y.

DIE FOR MOLDING HOLLOW ARTICLES OF CELLULOID OR ANALOGOUS MATERIAL.

SPECIFICATION forming part of Letters Patent No. 369,784, dated September 13, 1887.

Application filed September 29, 1886. Serial No. 214,832. (No model.)

*To all whom it may concern:*

Be it known that I, JOHN A. FURMAN, a citizen of the United States, residing at Newark, in the county of Essex and State of New Jersey, have invented certain new and useful Improvements in Dies for Molding Hollow Articles of Celluloid or Analogous Materials, of which the following is a specification, reference being had therein to the accompanying drawings.

Figure 1:
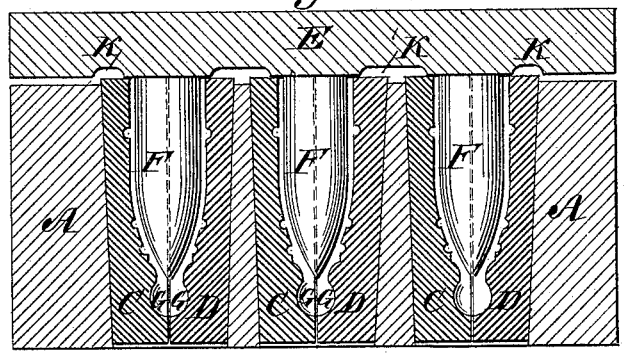
Figure 2:
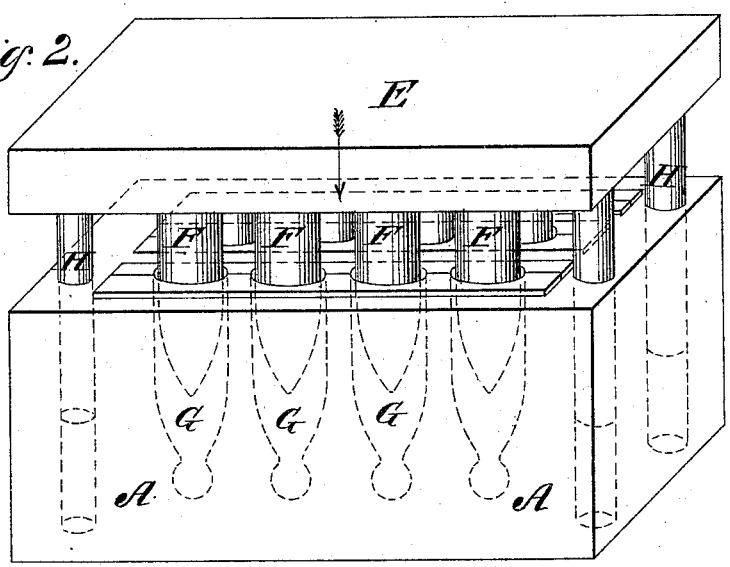
Figure 3:
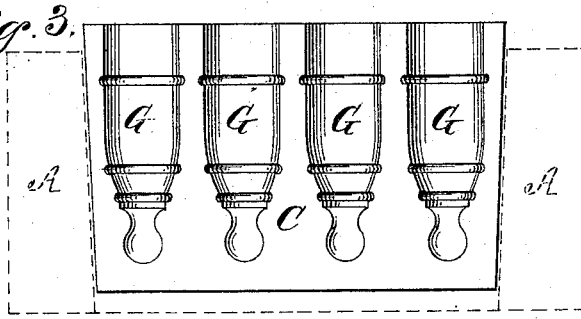

Figure 1 represents a vertical transverse section of the dies in the position which they assume when the article is pressed into shape. Fig. 2 represents the dies in perspective, with the top die and plungers partially raised. Fig. 3 is a side view of one of the divided dies and a longitudinal sectional view of the bottom plate. Fig. 4 is a vertical transverse section of a modified form of the dies in the position which they assume when the article is pressed into shape. Fig. 5 is a perspective view of said modified form, the top plate being raised.

My invention relates to improvements in dies for molding hollow articles out of celluloid or analogous materials; and the objects of my improvement are to provide dies which shall press a hollow article into shape by a single movement without forming a fin upon the line of the junction of the divided dies. I attain these objects by the mechanism illustrated in the drawings, in which similar letters refer to similar parts throughout the several views.

A is the bottom plate, having in it one or more openings for the insertion of the divided dies. These openings have their sides beveled or inclined toward one another, so that they are smaller at the bottom than at the top of the bottom plate, as shown in Figs. 1, 2, 3, 4, and 5.

C D are the divided molding-dies, between which the exterior form of the article is impressed upon the celluloid by means of the recesses G G, cut in said dies.

E is the top plate, having depending from it plungers F, of suitable form to impress upon the celluloid the interior surface of the article, and also of such form that they may be readily withdrawn from the article when the top plate is raised.

H H are pins for guiding the top plate and plungers.

I I, Fig. 5, are pins holding the modified form of divided dies in position.

When very small articles are to be formed by the dies—such as hollow charms—I prefer to employ the form of die shown in Figs. 4 and 5, in which the aperture in the bottom plate extends from end to end of the same, but does not extend through the plate from top to bottom. When, however, larger articles—such as handles or whistles—are to be formed, I prefer to employ the form of die shown in Figs. 1, 2, and 3, in which the apertures for the divided dies do not extend from end to end of the bottom plate, but in which said apertures do extend through the said plate from top to bottom, as shown in Figs. 1 and 3.

The divided dies C D are beveled or tapering at their sides from top to bottom, and they must be made to taper at the same angle as the aperture in the bottom plate, in order that when said divided dies C D are inserted in the bottom plate they will touch the sides of said apertures at all points. The divided dies C D being thus placed in position in the bottom plate, it is evident that when pressure is brought to bear upon them at the top, as by the descent of the top plate and the plungers, they will be forced very closely together by means of the beveled or tapered sides of said dies and apertures, and hence no celluloid or plastic material can enter between them. The divided dies C D being thus placed in position in the apertures of the bottom plate, A, celluloid is placed in each of the recesses G G. The top plate, with the plungers F, is then lowered upon said bottom plate, one of said plungers F entering centrally each of the recesses G, formed between the divided dies C D. The top plate, E, is then pressed upon the dies, as shown in Figs. 1 and 4, and the celluloid or analogous material within the recesses is forced to take the exterior form of the recesses and the interior form of the plungers, the surplus material being forced over the top of the divided dies C D into the aperture K. The articles being now completed, the top plate is removed, the plungers being thus extracted from the celluloid article. The dies C D are then removed from the bottom plate by a blow of a mallet upon the bottom of said dies, if they are formed as shown in Fig. 1, and by blows upon the ends of said dies if they are formed as shown in Fig. 5. The dies C D being then separated, the hollow article will fall out in completed form.

In both constructions shown the walls of the seat in the bottom plate in which the dies are placed are cut away, (the bottom wall in Figs. 1, 2, and 3 and the end wall or walls in Figs. 4 and 5,) to permit the dies to be struck in order that they may be loosened preparatory to their removal.

By means of the device which I have described I can mold a large number of articles at once, and that by the simply-constructed dies shown divided on a vertical line or a line parallel with the axes of the articles, each die being provided on its inner face with several recesses and having its outer face a plane surface, whereby the dies are held in their seats without necessitating the use of keys or similar confining devices, and may be easily and quickly removed from the holding-plate by loosening them by a few upward-directed blows and then lifting them out of their seats.

What I claim as my invention, and desire to secure by Letters Patent, is—

1. In dies for forming hollow articles from plastic material, a bottom plate having seats formed therein with tapering sides, and divided dies provided with recesses adapted to give shape to the exterior of the articles and having their outer faces tapering to conform to the said seats in the bottom plate, in combination with a top plate carrying plungers and arranged opposite the flaring portions of the die-seats, whereby the dies are crowded toward each other by the descent of the top plate and plungers, substantially as described.

2. In dies for forming hollow articles from plastic material, a bottom plate having seats formed therein, and dies adapted to said seats, each provided with several recesses, each adapted to give shape to the exterior of a portion of an article, said dies being placed in the seats face to face, their line of division being parallel with the axes of the recesses, in combination with a top plate and plungers, substantially as described.

3. In dies for forming hollow articles from plastic material, a bottom plate having a seat with tapering side walls formed therein, the walls being cut as described and for the purpose set forth, and dies adapted to said seat, each provided with several recesses, which give shape to the exterior of the articles, said dies being placed in said seats face to face, in combination with a top plate and plungers, substantially as described.

In testimony whereof I affix my signature in presence of two witnesses.

JOHN A. FURMAN.

Witnesses:
C. WYLLYS BETTS,
THOMAS HUNT.